July 14, 1925.
W. B. DEVEREUX
CAMP COOKER
Filed March 27, 1925
1,545,584
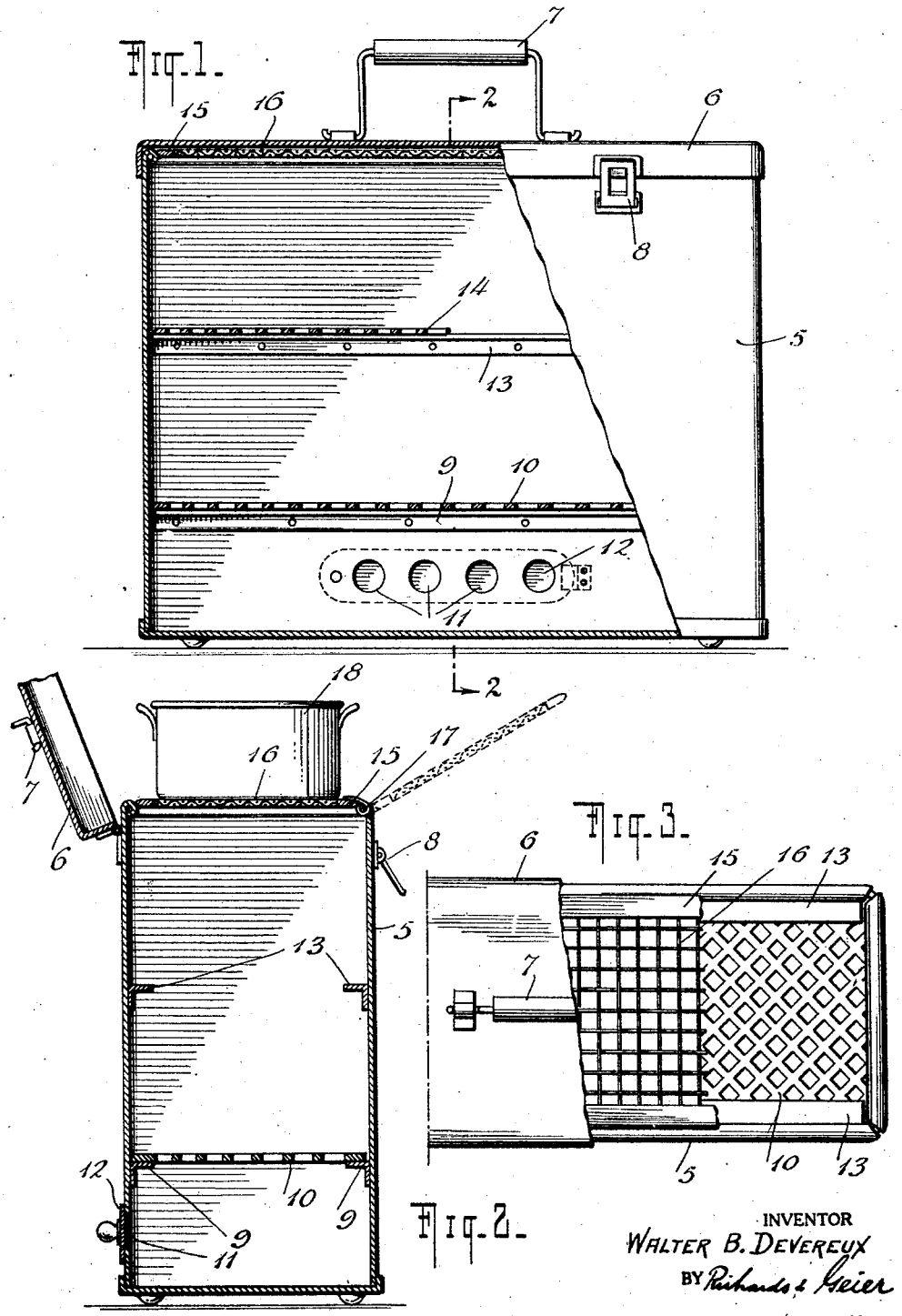

Patented July 14, 1925.

1,545,584

UNITED STATES PATENT OFFICE.

WALTER B. DEVEREUX, OF PERRY, MAINE.

CAMP COOKER.

Application filed March 27, 1925. Serial No. 18,666.

*To all whom it may concern:*

Be it known that I, WALTER B. DEVEREUX, a citizen of the United States, residing at Perry, county of Washington, and State of Maine, have invented certain new and useful Improvements in Camp Cookers, of which the following is a specification.

This invention relates to improvements in camp cookers and has for one of its objects to provide a cooker of simple, practical and inexpensive construction which may be easily and conveniently carried about and which, when stored, as for instance on the running board of an automobile, will occupy a minimum space.

The above and other objects will appear more clearly from the following detailed description, when taken in connection with the accompanying drawing, which illustrates a preferred embodiment of the inventive idea.

In the drawing—

Figure 1 is a side elevation, partly broken away and shown in section, of the cooker constructed in accordance with the invention.

Figure 2 is a transverse section on the line 2—2 of Figure 1, with the cover raised, and Figure 3 is a top plan view partly broken away.

Referring more particularly to the accompanying drawing, the numeral 5 indicates a receptacle forming the body of the cooker which is preferably of rectangular formation and of such a width that it may be easily stored on the running board of a motor vehicle, if so desired.

To the top of one of the side walls of the receptacle there is hinged the cover or top 6 provided with a suitable handle 7 by means of which the cooker may be conveniently carried about. On the side wall of the receptacle opposite to that to which the cover is hinged there is attached a pair of locks 8 of any well known construction which are utilized to engage and lock the cover 6 in its closed position.

Shelves 9, preferably formed of angle iron, are secured to the interior of the side walls of the receptacle a distance above the bottom thereof and are designed to removably support a fire grate 10 upon which fuel may be burned when the cooker is in use. One of the side walls of the receptacle is provided between the bottom thereof and the point of support of the grate 10 with a plurality of draft apertures 11 arranged in a horizontal row, the opening and closing of said apertures being controlled by a valve 12 in the form of an elongated plate pivoted at one end to said wall and capable of being swung in a plane parallel to said wall so that one or more of the apertures may be uncovered to regulate the amount of draft entering the receptacle.

A third grate including a frame 15 and foraminous center 16 is hingedly connected at 17 to the upper edge of the side wall of the receptacle opposite that one to which the cover 6 is connected and the free longitudinal edge of the frame 15 is designed to rest upon the beaded and reinforced upper edge of the latter wall when the grate is in its operative position.

In practice, the grate 14 may be utilized to support a suitable receptacle employed for baking purposes and at the same time one or more cooking utensils 18 may be placed upon the top grate with the cover 6 in open position as shown in Figure 2. With the grate 14 positioned so as to leave a clear unobstructed space at one or both ends thereof, it will be apparent that the heat from the fire upon the grate 10 will readily reach the utensil 18. After the cooker has been used, the top grate may be swung to the dotted line position shown in Figure 2, the other grates removed from their respective shelves and various utensils then stored in the receptacle together with the latter grates. The top grate is then swung to its supporting position and the cover 6 closed and locked.

What is claimed is:

1. A camp cooker including a receptacle, a fire grate supported therein above its bottom, a second grate supported in the receptacle between said fire grate and the top of said receptacle, a third grate hingedly connected to the top of one wall of said receptacle and supported in its operative position by the opposite wall of said receptacle, and a cover for the receptacle hingedly connected to the latter wall.

2. A camp cooker including a receptacle, a fire grate supported therein above its bottom, a second grate supported in the receptacle between said fire grate and the top of said receptacle, a third grate hingedly connected to the top of one wall of said receptacle and supported in its operative position by the opposite wall of said receptacle, a cover for the receptacle hingedly connected to the latter wall, one of the walls of the receptacle having a plurality of draft apertures therein below said fire grate, and a valve pivoted to said wall and movable in a plane parallel therewith to regulate the opening and closing of said apertures.

3. A camp cooker including a receptacle, a fire grate supported therein above its bottom, a second grate supported in the receptacle between the top thereof and said fire grate, said second grate being of a length less than that of the receptacle and capable of being moved longitudinally thereof to provide an unobstructed space between one end thereof and an adjacent end wall of the receptacle, a third grate hingedly connected to the top of one wall of said receptacle and supported in its operative position by the opposite wall of said receptacle, and a cover for the receptacle hingedly connected to the latter wall.

In testimony whereof I have affixed my signature.

WALTER B. DEVEREUX.